(12) United States Patent
Nishida

(10) Patent No.: US 12,461,186 B2
(45) Date of Patent: Nov. 4, 2025

(54) ELECTRONIC DEVICE, PROCESSING METHOD, AND PROGRAM

(71) Applicant: SEIKO EPSON CORPORATION, Tokyo (JP)

(72) Inventor: Kota Nishida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 409 days.

(21) Appl. No.: 18/190,594

(22) Filed: Mar. 27, 2023

(65) Prior Publication Data

US 2023/0305095 A1 Sep. 28, 2023

(30) Foreign Application Priority Data

Mar. 28, 2022 (JP) .................................. 2022-051055

(51) Int. Cl.
*H04W 64/00* (2009.01)
*G01S 5/00* (2006.01)
*G01S 13/08* (2006.01)
*G06F 21/30* (2013.01)

(52) U.S. Cl.
CPC ............ *G01S 5/0045* (2013.01); *G01S 13/08* (2013.01); *G06F 21/305* (2013.01)

(58) Field of Classification Search
CPC ....... H04W 84/18; H04W 4/80; H04W 4/023; G01S 5/0045; G01S 13/08; G06F 21/305; H02J 50/12; H04M 1/7253; H04L 12/2809

See application file for complete search history.

(56) References Cited

U.S. PATENT DOCUMENTS

2011/0007901 A1* 1/2011 Ikeda ................. H04N 1/00891
380/270
2011/0228311 A1 9/2011 Oguma
2015/0326704 A1* 11/2015 Ko .................... H04M 1/72457
455/456.3

FOREIGN PATENT DOCUMENTS

JP 2011-193308 A 9/2011

* cited by examiner

*Primary Examiner* — Phuoc H Doan
(74) *Attorney, Agent, or Firm* — WORKMAN NYDEGGER

(57) ABSTRACT

An electronic device for wirelessly communicating with a terminal device by a wireless communicator includes a direction information acquisition unit and a processor. The direction information acquisition unit acquires, based on a beacon signal received by the wireless communicator from the terminal device, direction information related to a direction of the terminal device with respect to a reference position of the electronic device. The processor performs image formation based on an image forming job corresponding to terminal identification information in the beacon signal when the processor determines that, based on the direction information, the terminal device is positioned in a first range which is a direction range of a predetermined angle.

15 Claims, 12 Drawing Sheets

ELECTRONIC DEVICE, PROCESSING METHOD, AND PROGRAM

The present application is based on, and claims priority from JP Application Serial Number 2022-051055, filed Mar. 28, 2022, the disclosure of which is hereby incorporated by reference herein in its entirety.

BACKGROUND

1. Technical Field

The present disclosure relates to an electronic device, a processing method, and a program.

2. Related Art

In the related art, an electronic device which performs user authentication is known. JP-A-2011-193308 discloses a method in which an image forming device as an electronic device includes a card reader and performs user authentication by reading an ID card.

However, JP-A-2011-193308 does not disclose a method of performing user authentication using a direction detection function of wireless communication.

SUMMARY

An aspect of the present disclosure relates to an electronic device for wirelessly communicating with a terminal device by a wireless communication unit, the electronic device including: a direction information acquisition unit configured to acquire, based on a beacon signal received by the wireless communication unit from the terminal device, direction information related to a direction of the terminal device with respect to a reference position of the electronic device; and a processing unit configured to perform image formation based on an image forming job corresponding to terminal identification information in the beacon signal when the processing unit determines that, based on the direction information, the terminal device is positioned in a first range which is a direction range of a predetermined angle.

An aspect of the present disclosure relates to a processing method including: performing wireless communication of wirelessly communicating with a terminal device; performing processing of acquiring, based on a beacon signal received based on the wireless communication, direction information related to a direction of the terminal device with respect to a reference position of an electronic device; and performing image formation based on an image forming job corresponding to terminal identification information in the beacon signal when a determination is made that, based on the direction information, the terminal device is positioned in a first range which is a direction range of a predetermined angle.

An aspect of the present disclosure relates to a non-transitory computer-readable storage medium storing a program. The program includes: causing a computer to function as a wireless communication unit configured to wirelessly communicate with a terminal device, a direction information acquisition unit configured to acquire, based on a beacon signal received by the wireless communication unit from the terminal device, direction information related to a direction of the terminal device with respect to a reference position of the electronic device; and a processing unit configured to perform image formation based on an image forming job corresponding to terminal identification information in the beacon signal when the processing unit determines that, based on the direction information, the terminal device is positioned in a first range which is a direction range of a predetermined angle.

DESCRIPTION OF EXEMPLARY EMBODIMENTS

Hereinafter, an embodiment will be described. The embodiment described below does not unduly limit contents of the present disclosure described in the claims. All configurations described in the embodiment are not necessarily essential constituent elements of the present disclosure.

Figure 1:
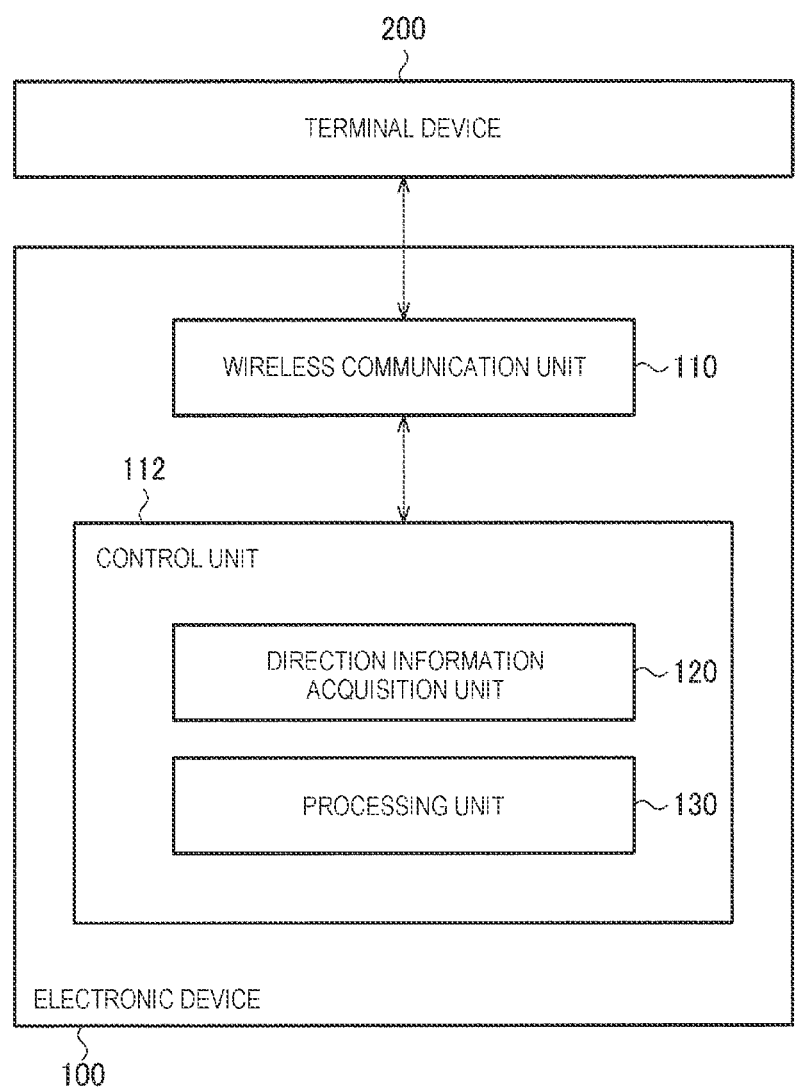
FIG. 1 is a diagram showing a configuration example of an electronic device.

FIG. 1 is a block diagram showing a configuration example of a system including an electronic device 100 and a terminal device 200 according to the embodiment. The electronic device 100 includes a wireless communication unit 110 and a control unit 112. The electronic device 100 performs wireless communication with the terminal device 200 by the wireless communication unit 110. The electronic device 100 according to the embodiment is not limited to the configuration in FIG. 1, and various modifications can be made, such as omitting some of the constituent elements or adding other constituent elements. The other constituent elements are, for example, a display unit or a memory. Although not shown in FIG. 1, the electronic device 100 may further include an operation unit 140. The operation unit 140 may be hardware integrated with a display unit (not shown) by a touch panel, for example.

The electronic device 100 according to the embodiment is, for example, a printer, but may be a scanner, a personal computer, a wearable device, a biological information measurement device, a robot, a video device, or a physical quantity measurement device. The wearable device refers to a smartwatch, an activity tracker, or the like. The biological information measurement device refers to a pulsimeter, a pedometer, or the like. The video device refers to a camera, a projector, or the like. The physical quantity measurement device refers to a thermometer, a scale, or the like. The printer here includes a multifunction peripheral. The multifunction peripheral refers to a printer having a function other than a printer function. The function other than the printer function is a copy function, a facsimile function, a scanner function, or the like, but may be another function. The terminal device 200 is, for example, a portable information terminal such as a smartphone, but may be the above-described personal computer, or the like. A configuration example of a system including the electronic device 100 and the terminal device 200 according to the embodiment is not limited to FIG. 1. For example, the electronic device 100 may wirelessly communicate with a plurality of terminal devices 200, or the terminal device 200 may wirelessly communicate with a plurality of electronic devices 100. The electronic device 100 according to the embodiment can also wirelessly communicate with an external device different from the terminal device 200 in FIG. 1.

The electronic device 100 according to the embodiment temporarily stores an image forming job in a memory (not shown) based on job data transmitted from the terminal device 200 or the like. The image forming job here refers to a set of data used for the electronic device 100 to execute image formation once. For example, the image forming job may include, in addition to image data to be subjected to the image formation, job identification information for uniquely identifying the image forming job, image formation setting information, and the like. The image formation setting information is, for example, information on a size of a sheet used for image formation, but may be information on color/monochrome setting, the number of sheets, or the like. By including the job identification information, the electronic device 100 can execute appropriate image formation without confusing image forming jobs. Accordingly, a user can acquire a desired image formation object. The job identification information includes user identification information for identifying a user who transmitted job data to the electronic device 100, and may include device identification information for identifying a device which transmitted the job data.

The wireless communication unit 110 is a communication interface for performing wireless communication according to a predetermined wireless communication standard. The wireless communication unit 110 can be implemented with, for example, hardware for communication such as an application specific integrated circuit (ASIC) for communication or a processor for communication, or firmware for communication. In the embodiment, a processing unit 130, which will be described later, performs communication control such as information transmission and information reception on the wireless communication unit 110, so that the wireless communication unit 110 can transmit information to an external device of the electronic device 100 or the like or receive information from the external device. There may be a plurality of types of predetermined wireless communication standards. That is, the wireless communication unit 110 includes hardware, firmware for communication, and the like corresponding to a desired wireless communication standard.

The wireless communication unit 110 can perform wireless communication according to a short-range wireless communication standard such as Bluetooth (registered trademark) as the predetermined wireless communication standard. In the embodiment, Bluetooth includes Bluetooth Low Energy (BLE), and may be simply referred to as BLE in the following description. That is, the wireless communication unit 110 of the electronic device 100 and the terminal device 200 according to the embodiment include BLE communication units (not shown) for each other. Accordingly, communication by BLE can be implemented between the electronic device 100 and the terminal device 200. It is assumed that the BLE communication unit is compatible with the standard of Bluetooth 5.1 or later versions. In other words, it is assumed that each unit in the electronic device 100 and the terminal device 200 according to the embodiment is compliant with the standard of Bluetooth 5.1 or later versions.

The wireless communication unit 110 may further perform wireless communication according to another wireless communication standard. The other wireless communication standard is, for example, wireless communication by Wi-Fi (registered trademark), and the wireless communication unit 110 may further perform wireless communication in a predetermined connection mode of Wi-Fi. The predetermined connection mode is, for example, the infrastructure mode or the ad hoc mode by the Wi-Fi, or the Wi-Fi Direct (registered trademark) mode, but may be another connection mode. Wi-Fi Direct can also be referred to as direct connection. Each predetermined connection mode can be freely set to be valid or invalid.

The control unit 112 performs data input and output control from and to each functional unit including the above-described wireless communication unit 110. For example, the control unit 112 executes various types of arithmetic processing based on a predetermined program read from a memory (not shown), an operation input signal from the operation unit 140, or various types of data received via the wireless communication unit 110, and controls an operation of display outputting to a display unit (not shown), for example. The predetermined program is, for example, basic software such as an operating system (OS), various application programs operating based on the basic software, or both of the basic software and the various application programs.

The control unit 112 can be implemented with a processor. That is, each processing according to the embodiment can be implemented with a processor which operates based on information such as a program, and a memory (not shown) which stores the information such as a program. The processor may be, for example, individual hardware which implements functions of respective units, or may be integrated hardware which implements the functions of the respective units. For example, the processor may include hardware. The hardware may include at least one of a circuit for processing a digital signal or a circuit for processing an analog signal. For example, the processor may include one or more circuit devices or one or more circuit elements mounted on a circuit board. The processor may be, for example, a central processing unit (CPU). The processor is not limited to a CPU, and various processors such as a graphics processing unit (GPU) or a digital signal processor (DSP) can be used. The processor may be a hardware circuit using ASIC. The processor may include an amplifier circuit, a filter circuit, or the like which processes analog signals.

The control unit 112 according to the embodiment includes a direction information acquisition unit 120 and the processing unit 130. That is, the electronic device 100 according to the embodiment includes the direction information acquisition unit 120 and the processing unit 130. For example, the control unit 112 implements functions of the direction information acquisition unit 120 and the processing unit 130 by reading and executing an image formation control program, which will be described later, from a memory (not shown). When basic software serving as a base is required in an operation of the image formation control program, the control unit 112 may read a program of the basic software from the memory (not shown) so that a function of, for example, the processing unit 130 can be implemented.

The direction information acquisition unit 120 acquires direction information related to a direction of the terminal device 200 with respect to a reference position of the electronic device 100 through wireless communication with the terminal device 200 by the wireless communication unit 110. The direction information can be acquired by, for example, the following method. For example, as described above, it is assumed that the BLE communication unit of the terminal device 200 broadcasts an advertising packet of BLE, and the BLE communication unit of the wireless communication unit 110 which receives the advertising packet includes a plurality of receiving antennas. At this time, since the advertising packet reaches each of the receiving antennas with a time difference, it is possible to estimate an angle of arrival (AOA) of a radio wave based on a first calculation method using a distance between the antennas and a wavelength of the radio wave, which are already understood. That is, although not shown, the reference position of the electronic device 100 is, for example, a position where the antennas of the BLE communication unit of the wireless communication unit 110 is positioned. The reference position can be positioned anywhere on the electronic device 100. A method for estimating the angle of arrival AOA including the first calculation method is known, and detailed description thereof is omitted.

The direction information may be acquired by, for example, the following method. The BLE communication unit of the terminal device 200 includes a plurality of transmitting antennas, and broadcasts an advertising packet of BLE while shifting a timing of transmitting a radio wave from each transmitting antenna. At this time, it is assumed that the advertising packet includes information on a timing at which each transmitting antenna transmits the advertising packet and distance information between transmitting antennas. The BLE communication unit of the wireless communication unit 110 can estimate an angle of departure (AOD) of the radio wave based on a second calculation method using a phase difference of advertising packets received from each transmitting antenna, information on a transmission timing in the advertising packet, and information between transmitting antennas. A method for estimating the angle of departure AOD including the second calculation method here is known, and detailed description thereof is omitted.

The processing unit 130 functions as the above-described image formation control program, and performs processing described later with reference to FIG. 2 and the like. For example, when the processing unit 130 determines that the terminal device 200 is positioned in a first range which is a direction range of a predetermined angle, the processing unit 130 performs image formation based on an image forming job corresponding to the terminal identification information in the beacon signal. The terminal identification information is, for example, a MAC address of the terminal device 200 stored in a payload of a protocol data unit in the advertising packet of the beacon signal, but may be other information such as a serial number if the information is interconvertible with the MAC address. For example, at a timing at which the above-described direction information acquisition unit 120 acquires the direction information by using advertising packet of BLE broadcasted by the BLE communication unit of the terminal device 200, the processing unit 130 acquires the terminal identification information based on the advertising packet. The processing unit 130 may function as a basic software or the like serving as a base of the image formation control program. A function of the basic software or the like is, for example, a function of converting orientation information acquired based on a geomagnetic sensor, a gyro sensor (not shown), or the like into information used in processing in the image formation control program to be described later. In the embodiment, the payload may further include other information. The other information is, for example, information on an intensity of the radio wave, which will be described in detail later.

Figure 2:
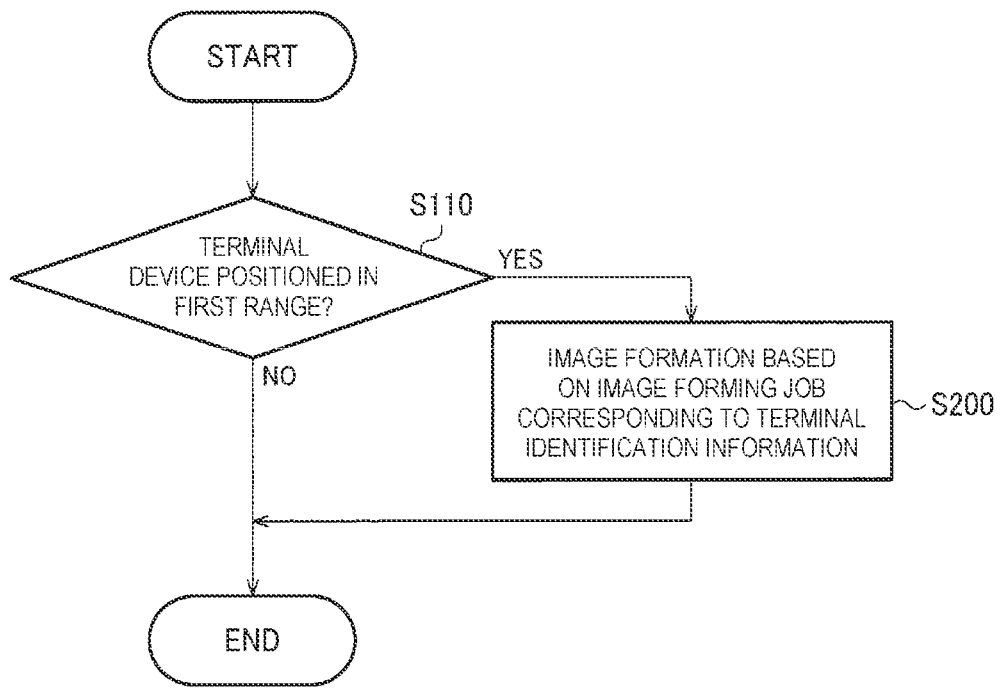
FIG. 2 is a flowchart showing a processing example according to the embodiment.

FIG. 2 is a flowchart showing a processing example of the image formation control program according to the embodiment. Processing in FIG. 2 is shown as a loop after a boot program of the electronic device 100 is activated. For example, the processing may be a timer interrupt performed at every constant time. The processing unit 130 performs processing of determining whether the terminal device 200 is positioned in the first range (step S110). The first range is a direction range of a predetermined angle from the above-described reference position, and can be appropriately set by an administrator or the like of the electronic device 100. The administrator of the electronic device 100 may be a user. The administrator or the like sets, as the first range, a direction range such that a direction range in which the user of the electronic device 100 approaches is a direction range of a predetermined angle from the above-described reference position, for example, for a predetermined reason. The predetermined reason is, for example, that the electronic device 100 is disposed at a predetermined corner of the floor, and that another device or the like is disposed in a direction other than a predetermined direction. It is assumed that the user of the electronic device 100 normally owns the terminal device 200. It is assumed that the electronic device 100 is a device dedicated to a single user. In this case, in step S110 of FIG. 2, the processing unit 130 determines whether the direction based on the direction information acquired by the direction information acquisition unit 120 is within a direction range of a predetermined angle from the above-described reference position. When the processing unit 130 determines that the direction based on the direction information acquired by the direction information acquisition unit 120 is within the direction range of the predetermined angle from the above-described reference position, the processing unit 130 determines that the user intends to use the electronic device 100.

When the processing unit 130 determines that the terminal device 200 is positioned in the first range (YES in step S110), the processing unit 130 performs image formation based on the image forming job corresponding to the terminal identification information (step S200), and ends the flow. On the other hand, when the processing unit 130 determines that the terminal device 200 is not positioned in the first range (NO in step S110), the processing unit 130 ends the flow. For example, when it is determined YES in step S110, the processing unit 130 performs processing of permitting the image formation with respect to the terminal device 200 owned by the user. Specifically, for example, a port for receiving the job data is closed in a normal state. When it is determined YES in step S110, the processing unit 130 performs processing of acquiring the terminal identification information and opening the port. The user operates the terminal device 200 to transmit job data to the electronic device 100, and the processing unit 130 immediately executes the image formation based on the received job data.

Accordingly, the processing unit 130 can perform the image formation based on the image forming job corresponding to the terminal identification information.

Thus, the electronic device 100 according to the embodiment is an electronic device 100 for wirelessly communicating with the terminal device 200 by the wireless communication unit 110, and includes the direction information acquisition unit 120 and the processing unit 130. The direction information acquisition unit 120 acquires, based on the beacon signal received by the wireless communication unit 110 from the terminal device 200, direction information related to the direction of the terminal device 200 with respect to the reference position of the electronic device 100. The processing unit 130 performs the image formation based on the image forming job corresponding to the terminal identification information in the beacon signal when the processing unit 130 determines that, based on the direction information, the terminal device 200 is positioned in the first range which is the direction range of the predetermined angle.

Thus, the electronic device 100 according to the embodiment includes the wireless communication unit 110 and the direction information acquisition unit 120, and thus can acquire the direction information based on the beacon signal broadcasted by the terminal device 200. The electronic device 100 according to the embodiment includes the processing unit 130, and thus can perform the image formation based on the image forming job when the terminal device 200 is positioned in the first range. Accordingly, the image formation can be performed at an appropriate timing.

The electronic device 100 which performs the image formation when the processing unit 130 determines that the terminal device 200 is positioned in the first range based on the direction information is not yet proposed. For example, it is assumed that a user positioned at a position away from a position of the electronic device 100 transmits the job data to the electronic device 100 via a PC or the like (not shown). In this case, if the processing unit 130 immediately performs the image formation based on the job data, a mix-up or the like of image formation objects related to the job data may occur before the user arrives at the position of the electronic device 100. Accordingly, when confidential information or the like is in the image formation object, the confidential information may leak. When a method is applied in which the processing unit 130 performs the image formation based on the job data after performing user authentication using a card reader or the like, confidentiality is secured, but it is necessary to separately dispose a card reader or the like, and further, it is necessary for the user to perform an authentication operation using an ID card or the like. For example, a method of acquiring distance information between the terminal device 200 owned by the user and the electronic device 100 using intensity information of a wireless communication radio wave and performing image formation using the distance information may be considered, but the image formation cannot be performed at an appropriate timing. This is because a timing at which the user approaches the electronic device 100 does not always coincide with a timing at which the user requires an image formation object. Thus, convenience of the electronic device 100 is not yet sufficient in the methods so far. In this regard, by applying the method according to the embodiment, the user can acquire the image formation object at an appropriate timing without requiring an authentication operation using an ID card or the like. Accordingly, the convenience of the electronic device 100 can be improved.

The method according to the embodiment may be implemented as a processing method. That is, the processing method according to the embodiment includes: performing wireless communication of wirelessly communicating with the terminal device 200; and performing processing of acquiring, based on a beacon signal received based on the wireless communication, direction information related to the direction of the terminal device 200 with respect to the reference position of the electronic device 100. The processing method according to the embodiment further includes performing the image formation based on the image forming job corresponding to the terminal identification information in the beacon signal when the processing unit 130 determines that, based on the direction information, the terminal device 200 is positioned in the first range which is the direction range of the predetermined angle. In this way, a similar effect as above can be obtained.

The method according to the embodiment may be implemented as a program. That is, the program according to the embodiment causes a computer to function as the wireless communication unit 110 which wirelessly communicates with the terminal device 200, the direction information acquisition unit 120, and the processing unit 130. The direction information acquisition unit 120 acquires, based on the beacon signal received by the wireless communication unit 110 from the terminal device 200, direction information related to the direction of the terminal device 200 with respect to the reference position of the electronic device 100. The processing unit 130 performs the image formation based on the image forming job corresponding to the terminal identification information in the beacon signal when processing unit 130 determines that, based on the direction information, the terminal device 200 is positioned in the first range which is the direction range of the predetermined angle. In this way, a similar effect as above can be obtained.

Figure 3:
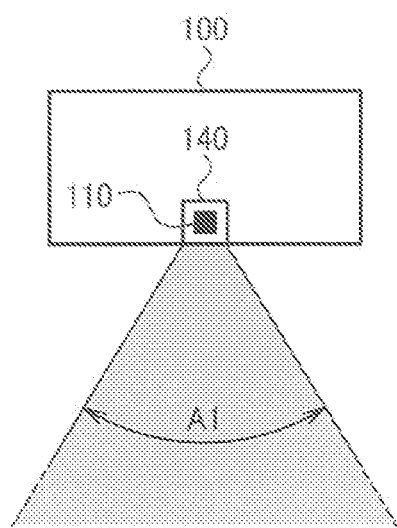
FIG. 3 is a diagram showing a first range.

The method according to the embodiment is not limited to the above, and various modifications can be made. For example, the reference position may be a position which can be checked from an outside of the electronic device 100. Specifically, for example, hardware for wireless communication functioning as the wireless communication unit 110 may be disposed, through a mounting process, on a substrate including a touch panel, an operation button, and the like functioning as the operation unit 140 of the electronic device 100. Accordingly, a position of the wireless communication unit 110 and a position of the operation unit 140 are the same, and the user can grasp the position of the wireless communication unit 110 from the outside of the electronic device 100. The operation unit 140 may be provided in a front direction of the electronic device 100. The front direction of the electronic device 100 is a direction from the electronic device 100 toward a position where the user is normally assumed to be positioned when the user uses the electronic device 100. That is, as shown in A1 of FIG. 3, a direction range of a predetermined angle including the above-described front direction may be set as the first range with reference to the antennas (not shown) in the BLE communication unit of the wireless communication unit 110. As described above, in the electronic device 100 according to the embodiment, the reference position is the position of the operation unit 140, and the first range is the direction range including the front direction from the operation unit 140. In this way, the processing unit 130 can execute the image formation based on the direction information with reference to a front side of the operation unit 140. Accordingly, it is possible to prevent the image formation from being executed at an inappropriate timing. The execution of the image formation at an inappropriate timing is, for example, performing the image formation based on the image forming job at a timing when the user and the terminal device 200 are positioned in a direction opposite to the operation unit 140.

The processing example according to the method according to the embodiment is not limited to the above, and various modifications can be made. Specifically, the processing example according to the embodiment is not limited to the example of FIG. 2, and may be, for example, examples shown in FIGS. 4 to 10 to be described later. In description of FIG. 4 and subsequent drawings, description of similar processing will be omitted as appropriate. Wording of processing shown in FIG. 4 and subsequent drawings is simplified as appropriate. In the following description, the Bluetooth standard is shown as a wireless communication standard. That is, in the electronic device 100 according to the embodiment, the beacon signal based on which the direction information acquisition unit 120 acquires the direction information conforms to the Bluetooth standard. In this way, it is possible to construct a system which performs the image formation using Bluetooth.

Although details will be described later, processing shown in FIGS. 4 to 10 may be appropriately combined. For example, step S100 and step S190, which will be described later in FIG. 4, may be incorporated into a flowchart in FIG. 5 or the like, and step S120 and step S122, which will be described later in FIG. 5, may be incorporated into a flowchart of FIG. 4 or the like. The similar applies to characteristic processing in FIGS. 6 to 10.

Figure 4:
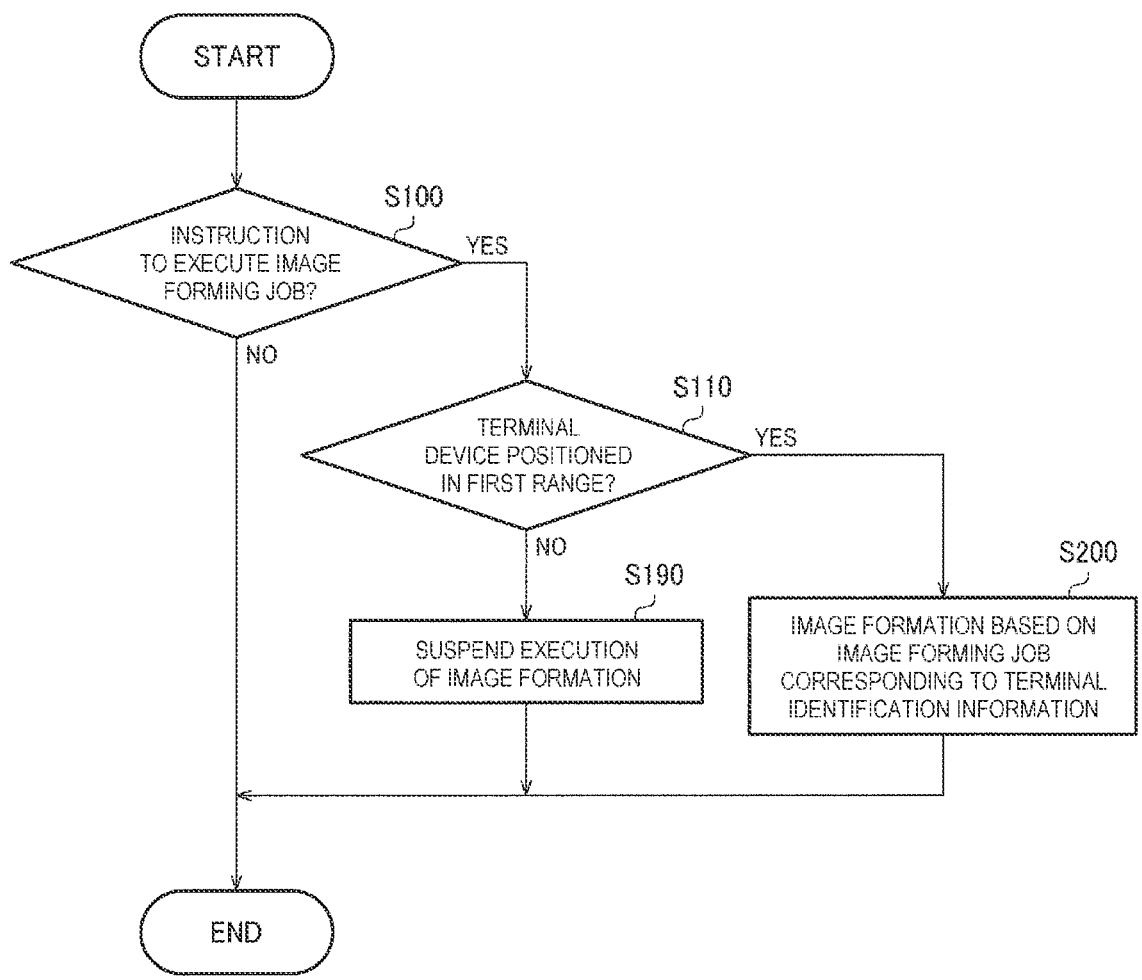
FIG. 4 is a flowchart showing another processing example according to the embodiment.

The method according to the embodiment may be, for example, a processing example shown in the flowchart of FIG. 4. The processing example in FIG. 4 is different from the processing example in FIG. 2 in that the processing example in FIG. 4 further includes step S100 and step S190 with respect to the processing example in FIG. 2. The processing unit 130 performs processing of determining whether there is an instruction to execute an image forming job (step S100). There being the instruction to execute the image forming job means, for example, that the received job data includes execution command data of the image formation, but may mean that the execution command data of the image formation is received separately from the job data. When the processing unit 130 determines that there is no instruction to execute the image forming job (NO in step S100), the processing unit 130 ends the flow. On the other hand, when the processing unit 130 determines that there is an instruction to execute the image forming job (YES in step S100), the processing unit 130 performs the processing of step S110 described above in FIG. 2. When the processing unit 130 determines that the terminal device 200 is positioned in the first range (YES in step S110), the processing unit 130 performs the processing of step S200 described above, and ends the flow. On the other hand, when the processing unit 130 determines that the terminal device 200 is not positioned in the first range (NO in step S110), the processing unit 130 performs processing of suspending the execution of the image formation (step S190).

In the example of FIG. 2, when the user possessing the terminal device 200 is not positioned in the first range, the electronic device 100 does not permit transmission of the job data, but in the example of FIG. 4, the electronic device 100 always permits the transmission of image forming job data, and the user can transmit the job data even when the terminal device 200 is positioned in a range outside the first range. Since the execution of the image formation is suspended until the processing unit 130 determines that the terminal device 200 is positioned in the first range, for example, a situation in which the image formation objects are mixed up by a third party other than the user does not occur. As described above, in the electronic device 100 according to the embodiment, the processing unit 130 suspends, when the instruction to execute the image forming job corresponding to the terminal identification information is performed, the image formation based on the image forming job corresponding to the terminal identification information until the processing unit 130 determines that the terminal device 200 is positioned in the first range based on the direction information. In this way, a timing at which the electronic device 100 executes the image formation can be made appropriate. Accordingly, the convenience of the electronic device 100 can be improved.

Figure 5:
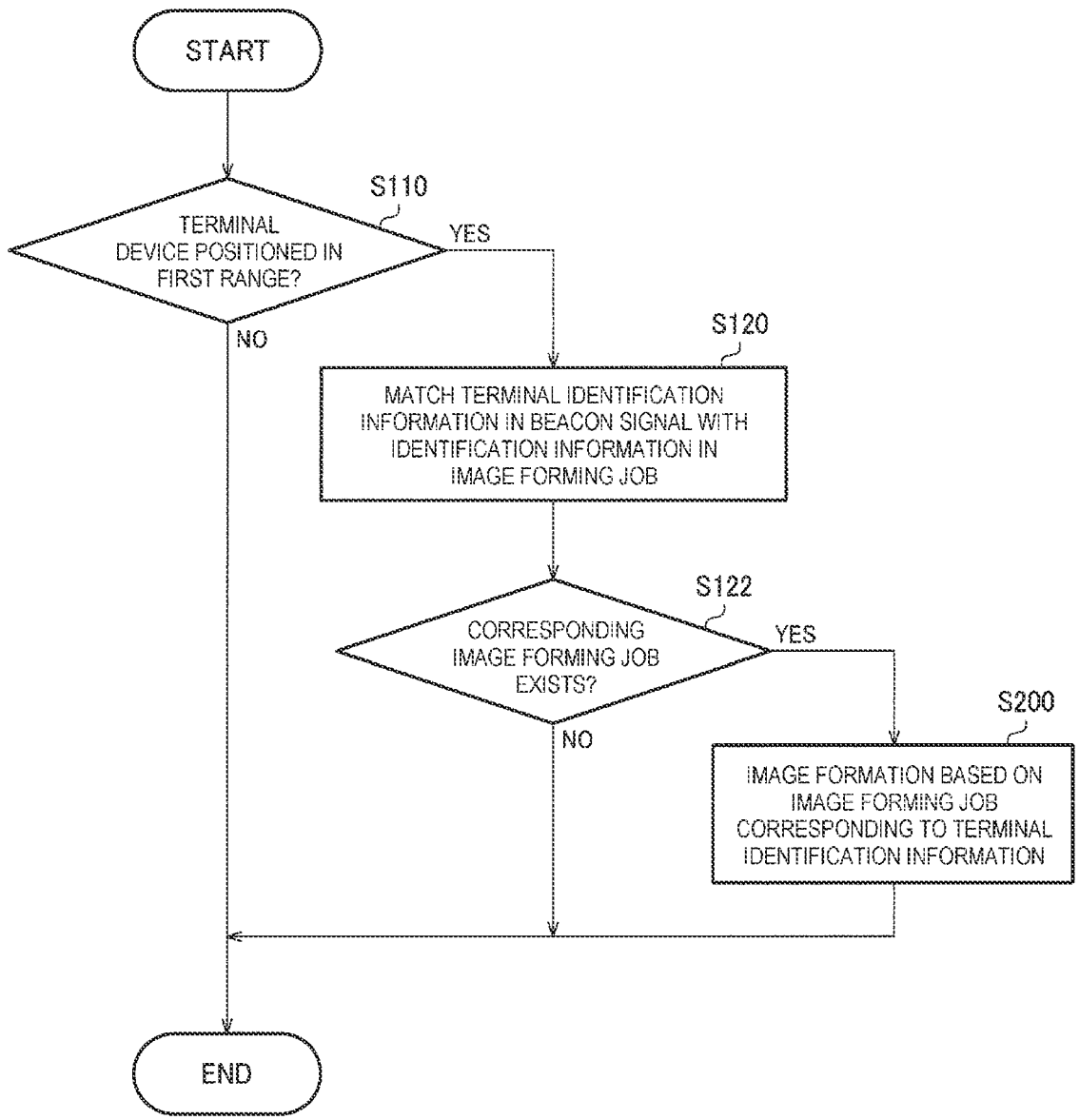
FIG. 5 is a flowchart showing another processing example according to the embodiment.

The method according to the embodiment may be, for example, a processing example shown in the flowchart of FIG. 5. The processing example in FIG. 5 is different from the processing example in FIG. 2 in that the processing example in FIG. 5 further includes step S120 and step S122 with respect to the processing example in FIG. 2. In the example of FIG. 2, the electronic device 100 is a dedicated device for a single user, but in the example of FIG. 5, it is assumed that the electronic device 100 is shared by a plurality of users. That is, a plurality of users can transmit job data to the electronic device 100.

The processing unit 130 performs the processing of step S110 in a similar manner as in FIG. 2, and ends the flow when the processing unit 130 determines that the terminal device 200 is not positioned in the first range (NO in step S110). On the other hand, when the processing unit 130 determines that the terminal device 200 is positioned in the first range (YES in step S110), the processing unit 130 performs processing of matching the terminal identification information in the beacon signal with identification information in the image forming job (step S120). For example, a table in which the MAC address of the terminal device 200 or identification information of the terminal device 200 which is interconvertible with the MAC address is associated with identification information of the user who owns the terminal device 200 or identification information which is interconvertible with the identification information is stored in advance in a memory (not shown). For example, in the case of YES in step S110, the processing unit 130 acquires the MAC address of the terminal device 200 in the advertising packet of the beacon signal of the terminal device 200 positioned in the first range or the identification information which is interconvertible with the MAC address. The processing unit 130 refers to the table to acquire user identification information corresponding to the acquired MAC address, and performs processing of searching for an image forming job including the user identification information or identification information which is interconvertible with the user identification information.

Thereafter, the processing unit 130 performs processing of determining whether there is an image forming job corresponding to the terminal identification information in the beacon signal (step S122). When the processing unit 130 determines that there is an image forming job corresponding to the terminal identification information in the beacon signal (YES in step S122), the processing unit 130 performs the processing of step S200 described above, and ends the flow. On the other hand, when the processing unit 130 determines that there is no image forming job corresponding to the terminal identification information in the beacon signal (NO in step S122), the processing unit 130 ends the flow. When it is determined NO in step S122, the processing unit 130 may perform processing of making a notification of a predetermined error. As described above, in the electronic device 100 according to the embodiment, the processing unit 130 performs authentication of matching the terminal identification information in the beacon signal with the identification information in the image forming job, and performs the image formation based on the image forming job. In this way, when a plurality of users share the electronic device 100, the electronic device 100 can perform image formation based on an image forming job from a desired user.

The identification information to be matched with the identification information in the beacon signal received by the wireless communication unit 110 in step S120 described above is the identification information in the image forming job temporarily stored in the memory (not shown) of the electronic device 100, but is not limited thereto. For example, although not shown, the processing unit 130 may perform processing of step S120 using the user identification information in the image forming job stored in a memory in a predetermined external server. The similar applies to a case of combining with other processing examples. Specifically, for example, the processing unit 130 performs processing of issuing an inquiry to the predetermined external server via the wireless communication unit 110 about whether an image forming job including desired user identification information is stored. When the predetermined external server stores the image forming job including the desired user identification information, it is determined YES in step S122. In step S200 in this case, for example, the processing unit 130 receives a desired image forming job from the predetermined external server via the wireless communication unit 110, and then performs image formation based on the image forming job. Thus, in the electronic device 100 according to the embodiment, the processing unit 130 selects the image forming job corresponding to the terminal identification information in the beacon signal from among a plurality of image forming jobs stored in an information processing device outside the electronic device 100 and performs image formation based on the selected image forming job when the processing unit 130 determines, based on the direction information, that the terminal device 200 is positioned in the first range. In this way, the processing unit 130 can perform the image formation based on the image forming job stored in the external information processing device. Accordingly, the convenience of the electronic device 100 can be improved.

Figure 6:
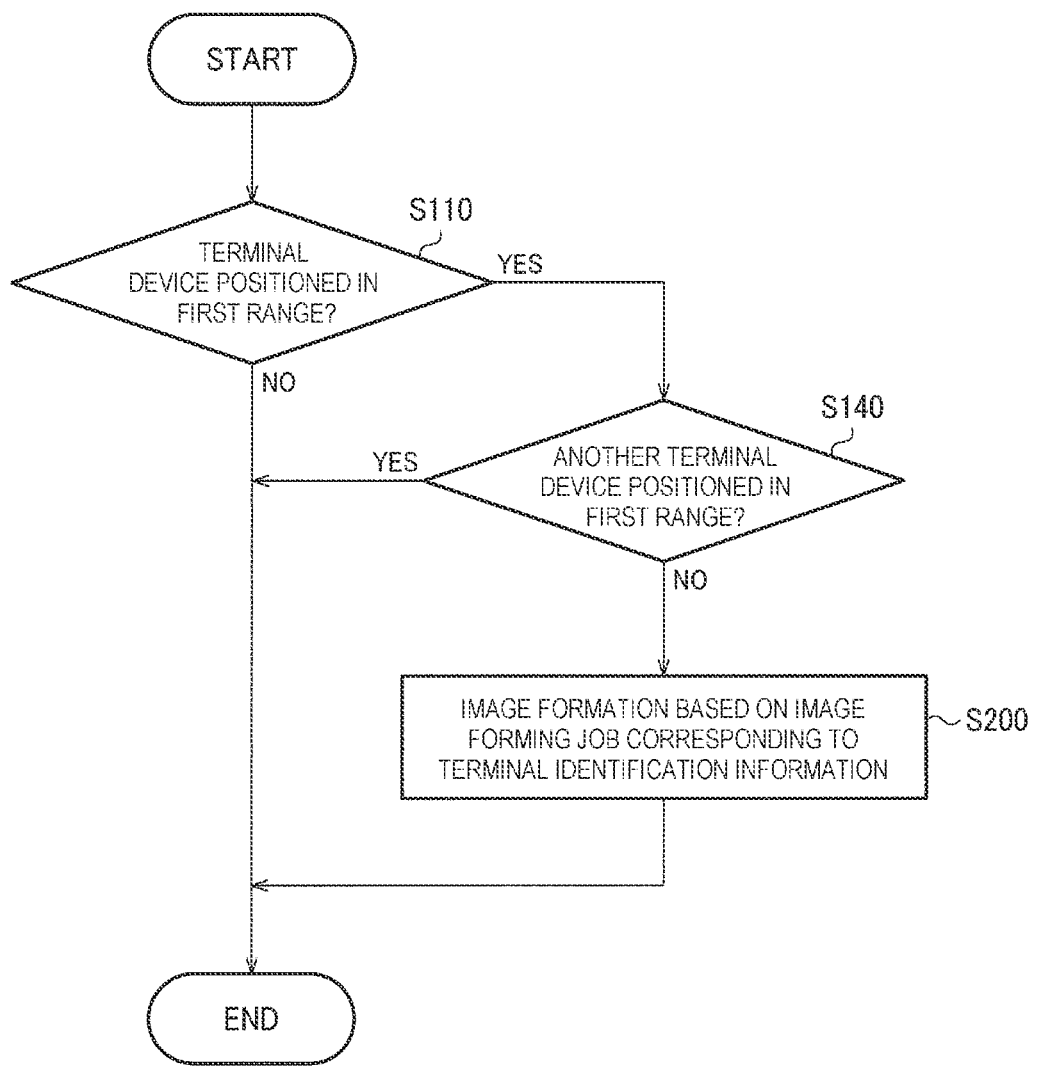
FIG. 6 is a flowchart showing another processing example according to the embodiment.

The method according to the embodiment may be, for example, a processing example shown in the flowchart of FIG. 6. The processing example in FIG. 6 is different from the processing example in FIG. 2 in that the processing example in FIG. 6 further includes step S140 with respect to the processing example in FIG. 2. The processing unit 130 performs the processing of step S110 in a similar manner as in FIG. 2, and when the processing unit 130 determines that the terminal device 200 is not positioned in the first range (NO in step S110), the processing unit 130 ends the flow. On the other hand, when the processing unit 130 determines that the terminal device 200 is positioned in the first range (YES in step S110), the processing unit 130 performs processing of determining whether another terminal device 200 is positioned in the first range (step S140). In other words, another terminal device 200 being positioned in the first range means that another user possessing the other terminal device 200 is positioned in the first range. Thereafter, when the processing unit 130 determines that the other terminal device 200 is not positioned in the first range (NO in step S140), the processing unit 130 performs the processing of step S200 described above, and ends the flow. On the other hand, when the processing unit 130 determines that the other terminal device 200 is positioned in the first range (YES in step S140), the processing unit 130 ends the flow. That is, when a plurality of users are positioned in the first range, the image formation is not executed. This is because a user other than the user who is to acquire the image formation object related to the image formation being positioned in the first range may cause mix-up or the like of image formation objects. Thus, in the electronic device 100 according to the embodiment, the processing unit 130 does not execute the image formation when the processing unit 130 determines that the terminal device 200 and the other terminal device 200 are positioned in the first range based on the beacon signal. In this way, it is possible to prevent mix-up or the like of image formation objects. Accordingly, it is possible to prevent leakage of information related to the image formation object.

Figure 7:
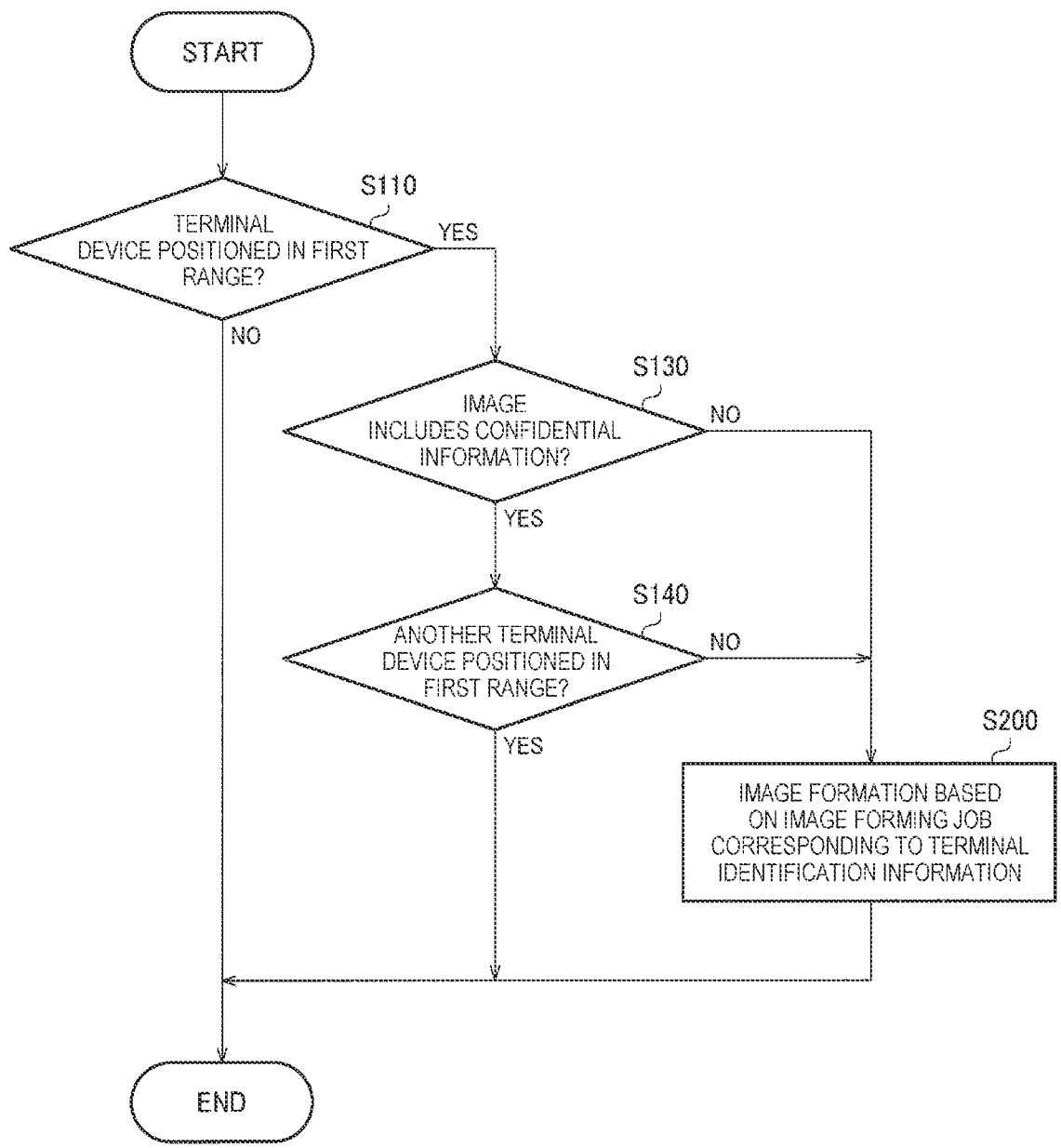
FIG. 7 is a flowchart showing another processing example according to the embodiment.

The method according to the embodiment may be, for example, a processing example shown in the flowchart of FIG. 7. The processing example in FIG. 7 is different from the processing example in FIG. 6 in that the processing example in FIG. 7 further includes step S130 with respect to the processing example in FIG. 6. The processing unit 130 performs the processing of step S110 in a similar manner as in FIG. 2, and when the processing unit 130 determines that the terminal device 200 is not positioned in the first range (NO in step S110), the processing unit 130 ends the flow.

On the other hand, when the processing unit 130 determines that the terminal device 200 is positioned in the first range (YES in step S110), the processing unit 130 performs processing of determining whether an image related to the image forming job includes confidential information (step S130). For example, the processing unit 130 performs processing of determining whether the image data in the image forming job includes image data indicating confidential information. The image data indicating confidential information is, for example, character image data such as "Handle with Care" and "Confidential", but may be character image data such as "Do Not Copy" and "Do not Duplicate", and can be appropriately set by the user.

Step S140 may be performed by a method using a machine learning technique. Specifically, for example, the processing unit 130 may determine whether image data indicating confidential information is included by inference based on a program in which an inference algorithm is described and a trained model including parameters used in the inference algorithm. In this case, the trained model is stored in a memory (not shown), and the trained model is read from the memory when the processing of step S140 is performed. The trained model is generated by an external learning device (not shown). In a training stage, for each image forming job, the trained model is updated by, for example, inputting the image forming job and the character image data determined by the user or the like to the learning device. As the inference algorithm, for example, a neural network can be adopted. A parameter thereof is a weighting factor of inter-node connection in the neural network. The neural network includes an input layer to which print information is input, an intermediate layer which performs arithmetic processing on data input through the input layer, and an output layer which outputs a recognition result based on an arithmetic result output from the intermediate layer. The inference algorithm is not limited to the neural network, and various machine learning techniques can be adopted. Since these techniques are all publicly known, detailed description is omitted.

When the processing unit 130 determines that the image related to the image forming job does not include confidential information (NO in step S130), the processing unit 130 performs the processing of step S200 described above, and ends the flow. On the other hand, when the processing unit 130 determines that the image related to the image forming job includes confidential information (YES in step S130), the processing unit 130 performs processing in and after step S140 described above. As described above, in the electronic device 100 according to the embodiment, the processing unit 130 determines whether the image related to the image forming job includes confidential information, and does not execute the image formation when the processing unit 130 determines that the image related to the image forming job includes confidential information and that, based on the beacon signal, the terminal device 200 and the other terminal device 200 are positioned in the first range. In this way, the image formation can be quickly executed while preventing information leakage. In the case of the processing example in FIG. 7, the image formation is performed on the image formation object which does not include the confidential information even when another terminal device 200 is positioned in the first range. This is because it is considered that there is no problem even if an image formation object which does not include confidential information is viewed by another user, and the image formation is preferably quickly executed.

Figure 8:
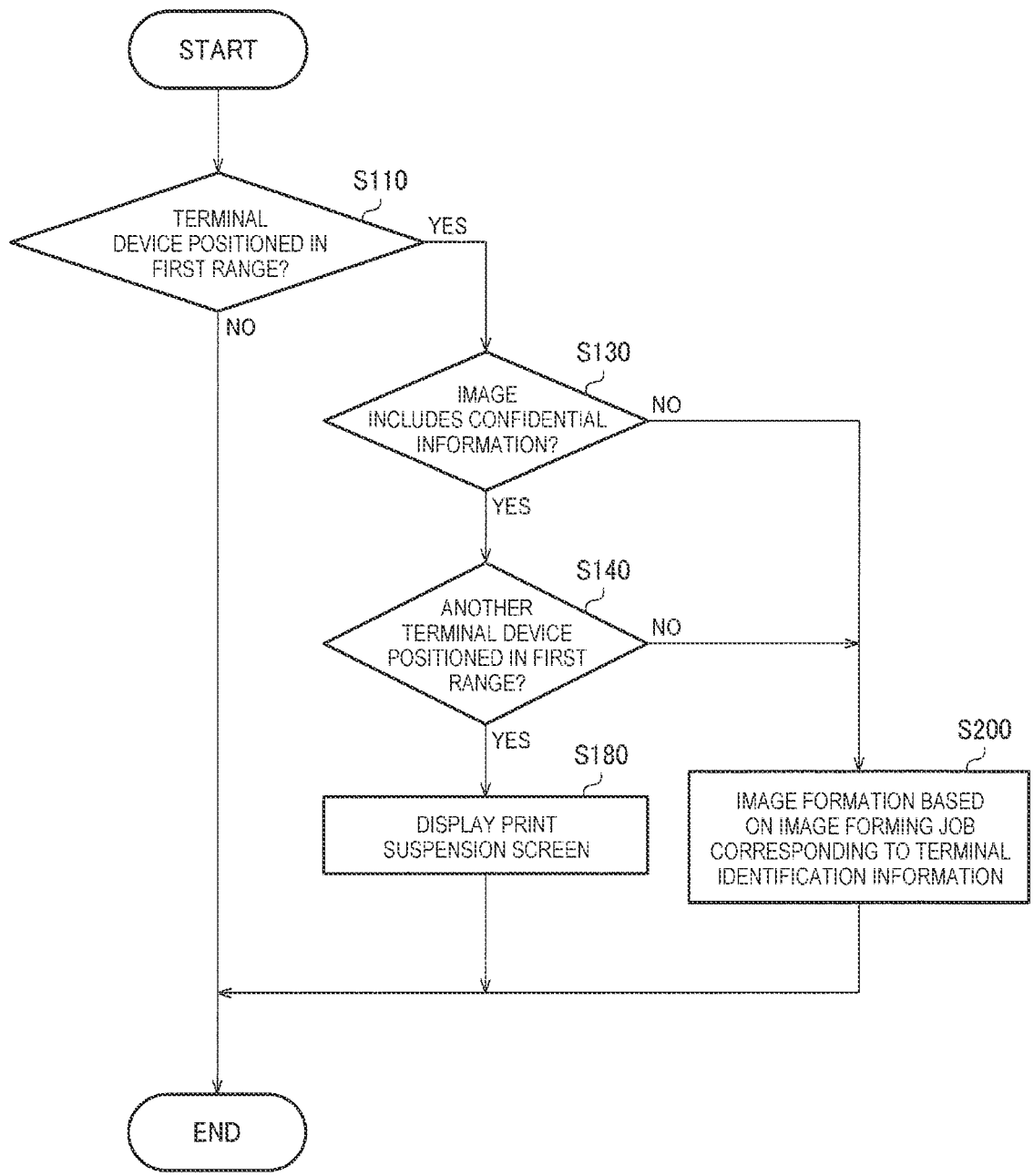
FIG. 8 is a flowchart showing another processing example according to the embodiment.

The method according to the embodiment may be, for example, a processing example shown in a flowchart of FIG. 8. The processing example in FIG. 8 is different from the processing example in FIG. 7 in that the processing example in FIG. 8 further includes step S180 with respect to the processing example in FIG. 7. When the processing unit 130 determines that the other terminal device 200 is positioned in the first range (YES in step S140), the processing unit 130 performs processing of displaying a print suspension screen (step S180), and ends the flow. In FIG. 8, a flow of the processing in step S110, step S130, and step S140, and the case of NO in step S140 is similar as that in FIG. 7, and description thereof is omitted. The print suspension screen, which is not shown in the drawings, is a display indicating that the other terminal device 200 is positioned in the first range, and is displayed on a display unit (not shown) of the electronic device 100. The processing unit 130 may perform processing of transmitting, to the terminal device 200, an instruction to display the print suspension screen on a display unit (not shown) of the terminal device 200. The processing example in FIG. 8 is an example in which step S180 is further added to the processing example in FIG. 7, and may also be an example in which step S180 is further added to the processing example in FIG. 6. In other words, in the processing example in FIG. 8, step S130 may be omitted.

Thus, in the electronic device 100 according to the embodiment, the processing unit 130 displays the print suspension screen when the processing unit 130 determines that the terminal device 200 and the other terminal device 200 are positioned in the first range based on the beacon signal. In this way, the user can recognize that there is another user possessing another terminal device 200 in the first range. Accordingly, the user can take appropriate countermeasures for the electronic device 100 to perform the image formation. For example, when the other user who possesses the other terminal device 200 is accidentally positioned in the first range, the user can ask the other user to leave the first range so that the electronic device 100 can perform image formation.

Figure 9:
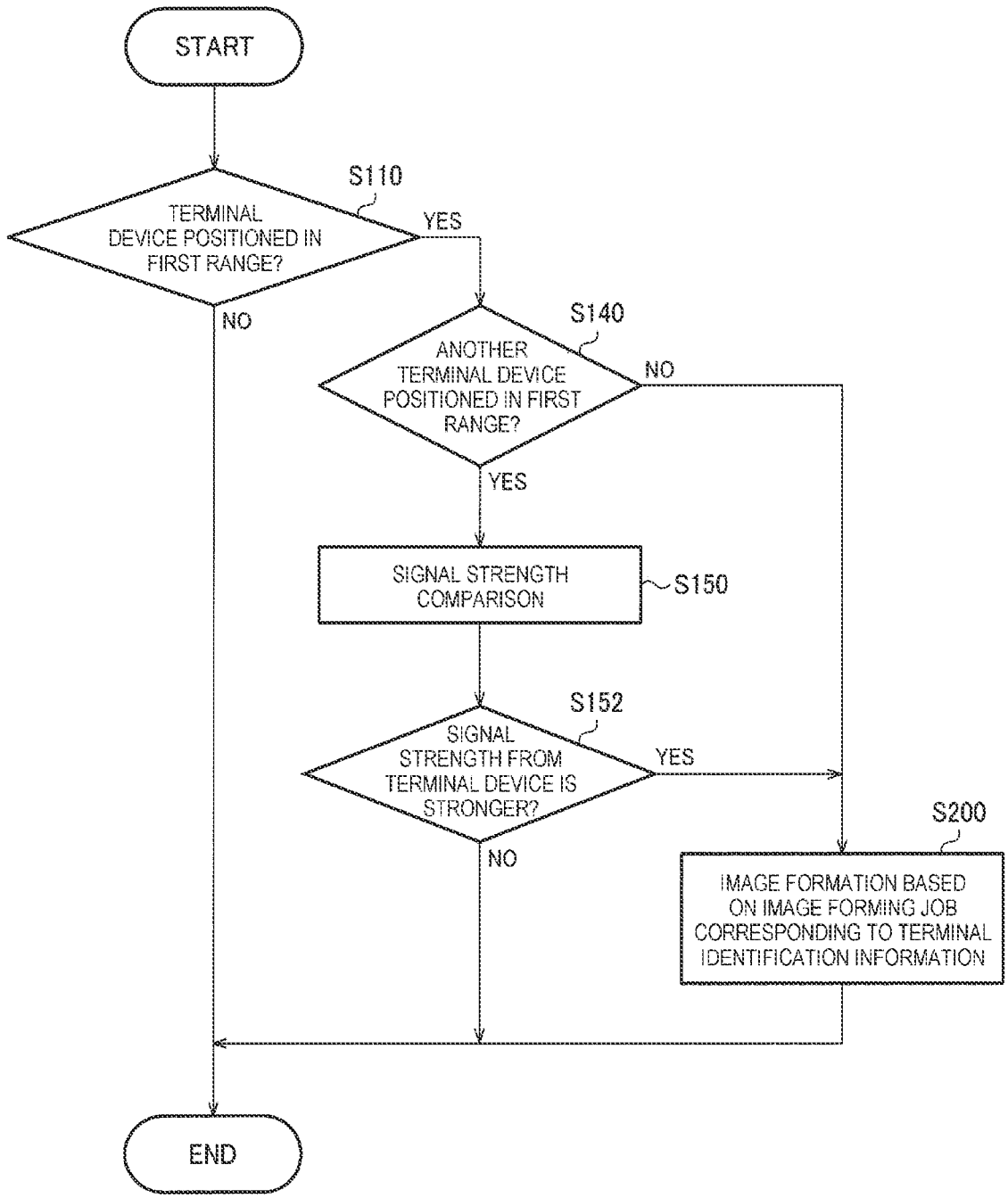
FIG. 9 is a flowchart showing another processing example according to the embodiment.

The method according to the embodiment may be, for example, a processing example shown in a flowchart of FIG. 9. The processing example in FIG. 9 is different from the processing example in FIG. 6 in that the processing example in FIG. 9 further includes step S150 and step S152 with respect to the processing example in FIG. 6. When the processing unit 130 determines that the other terminal device 200 is positioned in the first range (YES in step S140), the processing unit 130 performs signal strength comparison (step S150). Specifically, for example, the processing unit 130 performs processing of comparing strength of the beacon signal from the terminal device 200 with strength of a beacon signal from the other terminal device 200. When the processing unit 130 determines that the signal strength of the beacon signal from the terminal device 200 is stronger than the strength of the beacon signal from the other terminal device 200 (YES in step S152), the processing unit 130 performs the processing of step S200 described above, and ends the flow. On the other hand, when the processing unit 130 determines that the signal strength of the beacon signal from the terminal device 200 is weaker than the strength of the beacon signal from the other terminal device 200 (NO in step S152), the processing unit 130 ends the flow. Since a flow of the processing in the case of step S110, step S140, and NO in step S140 is similar as that in FIG. 6, description thereof is omitted. The processing example in FIG. 9 may be an example in which step S150 and step S152 are further included with respect to the processing example in FIG. 7. In other words, step S130 described above in FIGS. 7 and 8 may be further added to the processing example in FIG. 9.

Thus, in the electronic device 100 according to the embodiment, the processing unit 130 performs image formation based on the image forming job of the terminal device 200 when the processing unit 130 determines that the terminal device 200 and the other terminal device 200 are positioned in the first range and that the signal strength of the beacon signal from the terminal device 200 is stronger than the signal strength of the beacon signal from the other terminal device 200. In this way, the processing unit 130 can perform the image formation after determining that a situation is appropriate for execution of the image formation. For example, in the situation of YES in step S152, it is considered less likely that another user possessing another terminal device 200 mixes up image formation objects generated by the image formation. The signal strength of the beacon signal from the terminal device 200 is stronger than the strength of the beacon signal from the other terminal device 200 because the user of the terminal device 200 is closer to the electronic device 100 than the user of the other terminal device 200.

Figure 10:
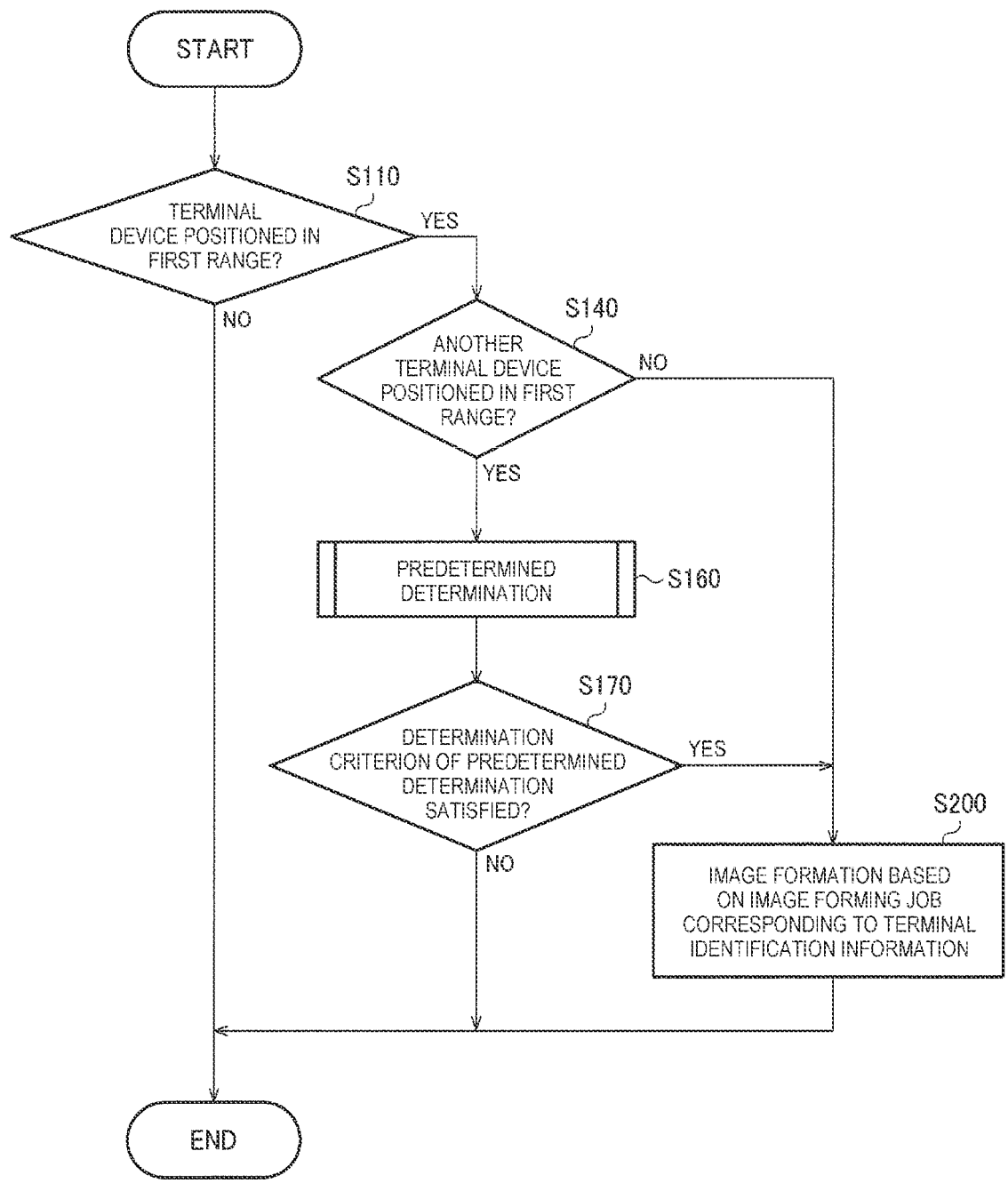
FIG. 10 is a flowchart showing another processing example according to the embodiment.

The method according to the embodiment may be, for example, a processing example shown in a flowchart of FIG. 10. The processing example in FIG. 10 is different from the processing example in FIG. 6 in that the processing example in FIG. 10 further includes step S160 and step S170 with respect to the processing example in FIG. 6. When the processing unit 130 determines that the other terminal device 200 is positioned in the first range (YES in step S140), the processing unit 130 performs predetermined determination (step S160), and then performs processing of determining whether a result of the predetermined determination (step S160) satisfies a determination criterion (step S170). Details of predetermined determination in step S160 and the determination criterion in step S170 will be described later together with description of FIG. 11. Thereafter, when the processing unit 130 determines that the result of the predetermined determination (step S160) satisfies the determination criterion (YES in step S170), the processing unit 130 performs the processing of step S200 described above, and ends the flow. On the other hand, when the processing unit 130 determines that the result of the predetermined determination (step S160) does not satisfy the determination criterion (NO in step S170), the processing unit 130 ends the flow. Since a flow of the processing in the case of step S110, step S140, and NO in step S140 is similar as that in FIG. 6, description thereof is omitted. The processing example in FIG. 10 may be an example in which step S160 and step S170 are further included with respect to the processing example in FIG. 7. In other words, step S130 described above in FIGS. 7 and 8 may be further added to the processing example in FIG. 10.

Figure 11:
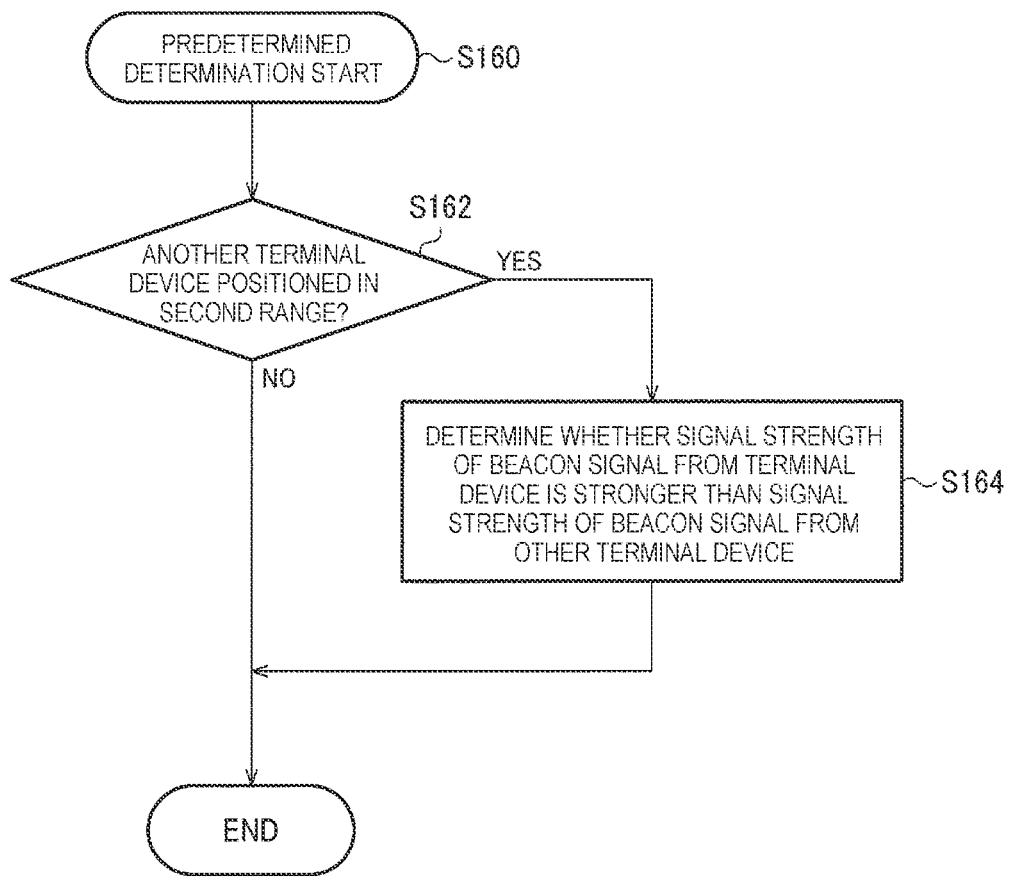
FIG. 11 is a flowchart showing a processing example of predetermined determination.

FIG. 11 is a flowchart showing a detailed processing example of the predetermined determination (step S160). The processing unit 130 performs processing of determining whether another terminal device 200 is positioned in a second range (step S162). The second range is a direction range narrower than a direction range indicated by A1 described above with reference to a virtual line coupling the reference position described above with reference to FIG. 3 and the terminal device 200. For example, when a user positioned at a position B10 in FIG. 12 possesses the terminal device 200, a direction range indicated by A2 is the second range, and the second range is in the first range. This is because it is assumed that the terminal device 200 is positioned in the first range in step S110.

When the processing unit 130 determines that the other terminal device 200 is not positioned in the second range (NO in step S162), the processing unit 130 ends the flow. In other words, for example, when another user possessing the other terminal device 200 is positioned in the first range but not in the second range, the processing unit 130 determines NO in step S162. More specifically, when the user positioned at the position B10 in FIG. 12 described above is in possession of the terminal device 200, for example, when another user possessing another terminal device 200 is positioned at a position B30, the processing unit 130 determines NO in step S162. Accordingly, the processing unit 130 deems that the determination criterion of the predetermined determination is not satisfied, and determines NO in step S170.

Figure 12:
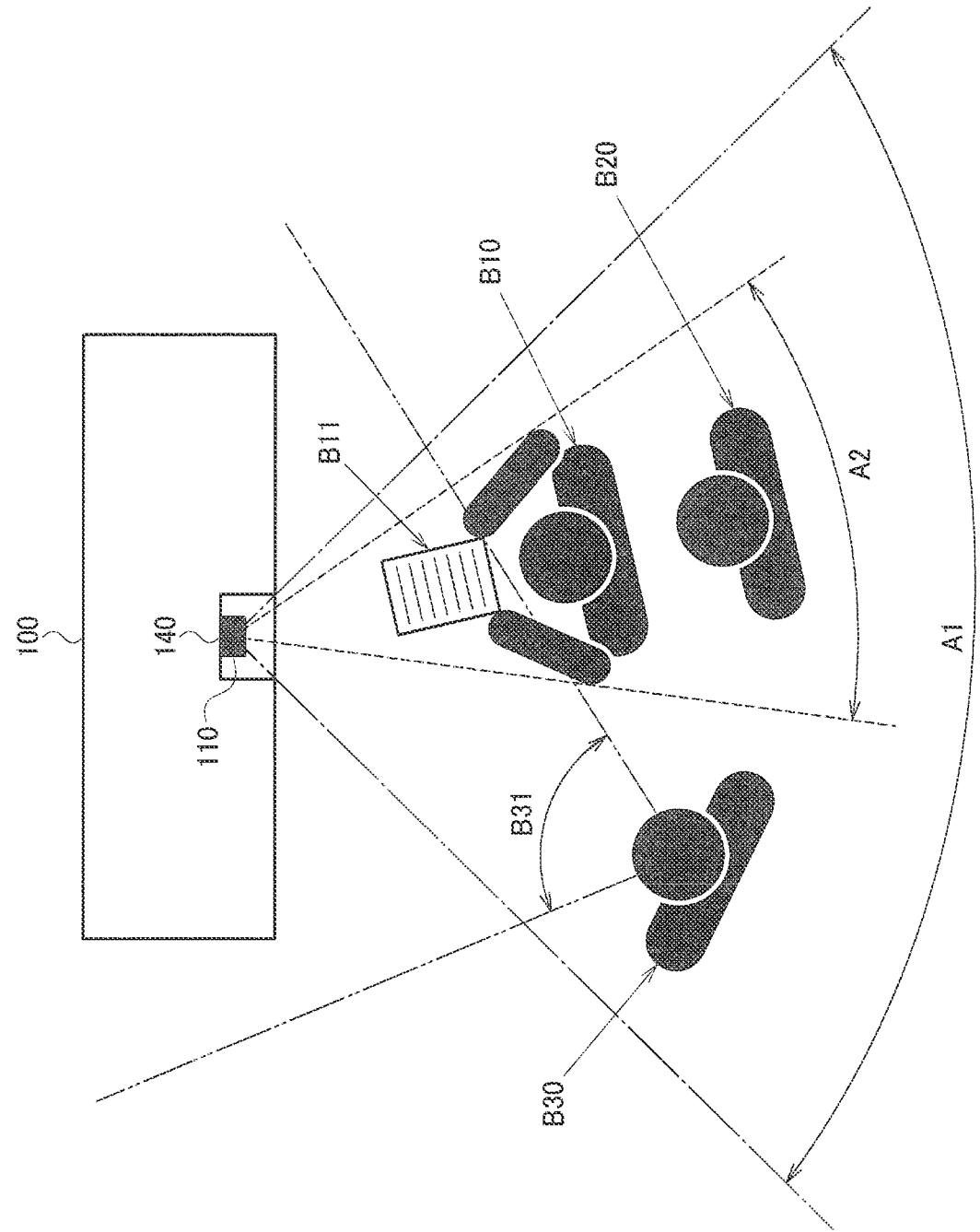
FIG. 12 is a diagram showing a second range.

On the other hand, when the processing unit 130 determines that the other terminal device 200 is positioned in the second range (YES in step S162), the processing unit 130 performs processing of determining whether the signal strength of the beacon signal from the terminal device 200 is stronger than the signal strength of the beacon signal from the other terminal device 200 (step S164), and ends the flow. The case where the signal strength of the beacon signal from the terminal device 200 is stronger than the signal strength of the beacon signal from the other terminal device 200 is, for example, as shown in FIG. 12, a case where a user who owns the terminal device 200 is positioned at the position indicated by B10 and a user who owns the other terminal device 200 is positioned at a position indicated by B20. In this case, the processing unit 130 determines YES in step S170 of FIG. 10, and executes the image formation in step S200 described above. This is because, for example, the situation where another user who owns the other terminal device 200 is positioned at the position in the second range indicated by B20 is considered to be an appropriate situation to perform the image formation, because there is a user at the position indicated by B10 and thus an image formation object shown in B11 is unlikely to be in a field of view of the other user.

When the signal strength of the beacon signal from the terminal device 200 is weaker than the signal strength of the beacon signal from the other terminal device 200, the processing unit 130 determines NO in step S170 of FIG. 10. That is, satisfying the determination criterion of the predetermined determination means that the processing unit 130 performs step S164 and determines in step S164 that the signal strength of the beacon signal from the terminal device 200 is stronger than the signal strength of the beacon signal from the other terminal device 200.

As described above, in the electronic device 100 according to the embodiment, the processing unit 130 performs the predetermined determination of determining whether the other terminal device 200 is positioned in the second range which is a direction range narrower than the first range with reference to the reference position and the direction of the terminal device 200 when the processing unit 130 determines that the terminal device 200 and the other terminal device 200 are positioned in the first range. The processing unit 130 performs the image formation based on the image forming job of the terminal device 200 when the processing unit 130 determines that the other terminal device 200 is positioned in the second range in the predetermined determination and that the signal strength of the beacon signal from the terminal device 200 is stronger than the signal strength of the beacon signal from the other terminal device 200. In this way, the processing unit 130 can perform the image formation after determining that a situation is appropriate for execution of the image formation while considering the field of view of the other user who possesses the other terminal device 200. For example, it is assumed that there is a case where another user who owns the other terminal device 200 is positioned at the position shown in B30 of FIG. 12 described above. In this case, for example, since the image formation object indicated by B11 described above enters the field of view of the other user indicated by B31, confidential information related to the image formation object indicated by B11 may be leaked to the other user. In this regard, by applying the method according to the embodiment, when another terminal device 200 is positioned in the first range excluding the second range, a determination result in step S162 of FIG. 11 is NO, and a determination result in step S170 of FIG. 10 is NO, so that the processing does not proceed to step S200, and the processing unit 130 does not execute the image formation. Therefore, it is possible to prevent leakage of confidential information related to an image formation object.

Although the processing example using the first range or the like based on the direction information is described above, the method according to the embodiment is not limited thereto, and a processing example in which the distance information is further considered may be used. For example, although not shown, a direction range indicated by A1 and a range of a predetermined distance from the reference position may be set as the first range. The processing unit 130 can acquire distance information by, for example, the following method and set the distance information as the first range. When the BLE communication unit of the wireless communication unit 110 receives a radio wave based on BLE, the advertising packet of BLE includes reference intensity information on the radio wave, and thus the processing unit 130 can acquire information on a distance between the terminal device 200 and the electronic device 100. A reference intensity of the radio wave is a received signal strength indication (RSSI) of a beacon signal at a reception side device when the reception side device is disposed at a position away from a transmission side device for the beacon signal by a reference distance. Since an intensity of the radio wave is inversely proportional to a square of the distance, if the intensity of the radio wave at the reference distance is understood, the processing unit 130 can calculate, based on the intensity of the radio wave of a beacon signal of BLE actually received by the BLE communication unit, information related to the distance between the terminal device 200 and the electronic device 100 and the like. Information and the like related to the distance between the terminal device 200 and the electronic device 100 is a specific distance, such as "1.5 m", but may also be information which can differentiate between the first range and a range other than the first range. As described above, in the electronic device 100 according to the embodiment, the processing unit 130 performs the image formation when the terminal device 200 is positioned in the first range and in the distance range of the predetermined distance. In this way, the first range can be set to a more appropriate range. Accordingly, a timing at which the image formation is performed can be made more appropriate.

Figure 13:
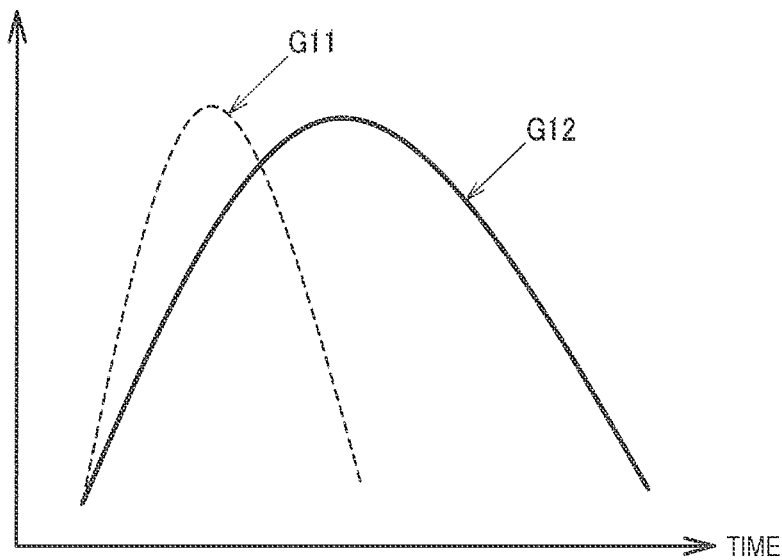
FIG. 13 is a diagram showing an example of signal strength.

The method according to the embodiment is not limited to the above, and various modifications can be made. For example, the processing unit 130 may perform processing in which a strength change amount of the beacon signal is further considered in addition to the direction information. For example, it is assumed that there is a first user who passes in front of the electronic device 100 and a second user who approaches the electronic device 100 in order to use the electronic device 100. In this case, the signal strength of a beacon signal from the terminal device 200 owned by the first user and the signal strength of a beacon signal from the terminal device 200 owned by the second user behave differently. Specifically, for example, the first user passes in front of the electronic device 100 without slowing down, and the second user approaches the electronic device 100 while slowing down in order to perform predetermined work in front of the electronic device 100. Therefore, the signal strength of the beacon signal from the terminal device 200 owned by the first user changes as indicated by G11 in FIG. 13, and the signal strength of the beacon signal from the terminal device 200 owned by the second user changes as indicated by G12 in FIG. 13. Accordingly, the processing unit 130 can determine, based on a behavior of the signal strength of the beacon signal, whether the received beacon signal is a beacon signal based on the terminal device 200 of the first user. Although a flowchart is not shown, when the processing unit 130 determines that the received beacon signal is a beacon signal from the terminal device 200 of the first user based on the behavior of the signal strength of the beacon signal, the processing unit 130 may not perform the above-described processing of step S200 or the like. This is because the first user does not use the electronic device 100, and thus it is not necessary to perform the processing of step S200 and the like.

Figure 14:
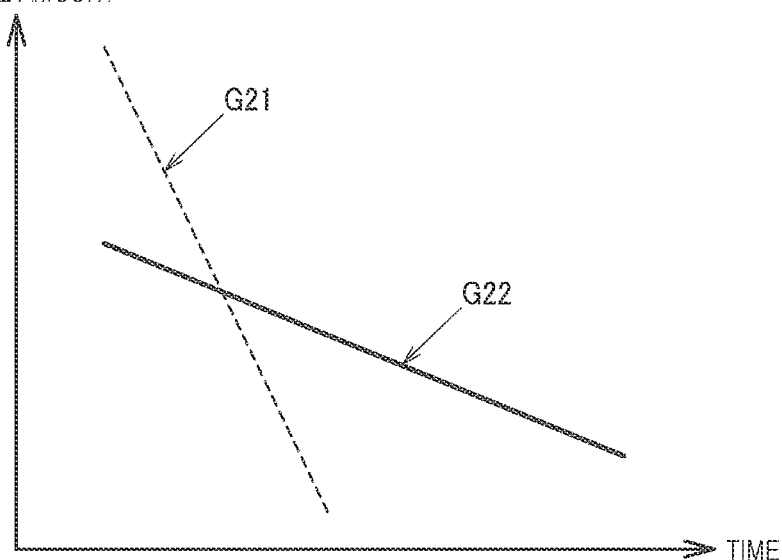
FIG. 14 is a diagram showing an example of a signal strength change amount.

The processing unit 130 may perform processing of obtaining a signal strength change amount and determining, based on the change amount, whether the received beacon signal is a beacon signal based on the terminal device 200 of the first user. For example, when graphs indicated by G11 and G12 in FIG. 13 can be approximated to quadratic curves, differentiation by time results in straight lines indicated by G21 and G22 in FIG. 14. When the straight line G21 and the straight line G22 are compared, it can be seen that a slope of the straight line G21 is larger than that of the straight line G22. Accordingly, for example, the processing unit 130 may perform, based on the signal strength of the received beacon signal, processing of obtaining the signal strength change amount as shown in FIG. 14, and may determine that the beacon signal is from the terminal device 200 of the first user when the slope of the straight line indicating the signal strength change amount is larger than a predetermined magnitude. When the processing unit 130 determines that the received beacon signal is a beacon signal from the terminal device 200 of the first user, the processing unit 130 may not perform the above-described processing of step S200 and the like. As described above, in the electronic device 100 according to the embodiment, the processing unit 130 determines, when the processing unit 130 determines that the terminal device 200 is positioned in the first range, whether to perform the image formation based on the signal strength change amount of the beacon signal. In this way, the processing unit 130 can perform the image formation after determining whether the user is a user who uses the electronic device 100.

As described above, an electronic device according to the embodiment is an electronic device for wirelessly communicating with a terminal device by a wireless communication unit, and includes a direction information acquisition unit and a processing unit. The direction information acquisition unit acquires, based on a beacon signal received by the wireless communication unit from the terminal device, direction information related to a direction of the terminal device with respect to a reference position of the electronic device. The processing unit performs image formation based on an image forming job corresponding to terminal identification information in the beacon signal when the processing unit determines that, based on the direction information, the terminal device is positioned in a first range which is a direction range of a predetermined angle.

As described above, the electronic device according to the embodiment performs the image formation based on the image forming job when the terminal device is positioned in the first range, and thus can perform the image formation at an appropriate timing. The user can acquire an image formation object at an appropriate timing without requiring an operation of causing a card reader to read an ID card. Accordingly, convenience of the electronic device can be improved.

The processing unit may perform the image formation when the terminal device is positioned in the first range and in a distance range of a predetermined distance.

In this way, the first range can be set to a more appropriate range.

The reference position may be a position of an operation unit, and the first range may be a range including a front direction from the operation unit.

In this way, the processing unit can execute the image formation based on the direction information with reference to a front side of the operation unit.

The processing unit may perform authentication of matching the terminal identification information in the beacon signal with identification information in the image forming job, and perform the image formation based on the image forming job.

In this way, when a plurality of users share the electronic device, the processing unit can perform image formation based on an image forming job from a desired user.

The processing unit may not execute the image formation when the processing unit determines that, based on the beacon signal, the terminal device and another terminal device are positioned in the first range.

In this way, it is possible to prevent mix-up or the like of image formation objects.

The processing unit may determine whether an image related to the image forming job includes confidential information, and may not execute the image formation when the processing unit determines that the image related to the image forming job includes the confidential information and that, based on the beacon signal, the terminal device and the other terminal device are positioned in the first range.

In this way, the image formation can be quickly executed while preventing information leakage.

The processing unit may display a print suspension screen when the processing unit determines that, based on the beacon signal, the terminal device and the other terminal device are positioned in the first range.

In this way, the user can recognize that there is another user possessing the other terminal device in the first range.

The processing unit may perform image formation based on the image forming job of the terminal device when the processing unit determines that the terminal device and the other terminal device are positioned in the first range and that a signal strength of the beacon signal from the terminal device is stronger than a signal strength of the beacon signal from the other terminal device.

In this way, the processing unit can perform the image formation after determining that a situation is appropriate for execution of the image formation.

The processing unit may perform, when the processing unit determines that the terminal device and another terminal device are positioned in the first range, predetermined determination of determining whether the other terminal device is positioned in a second range which is a direction range narrower than the first range with reference to the reference position and the direction of the terminal device. The processing unit may perform the image formation based on the image forming job of the terminal device when the processing unit determines that the other terminal device is positioned in the second range in the predetermined determination and that a signal strength of the beacon signal from the terminal device is stronger than a signal strength of the beacon signal from the other terminal device.

In this way, the processing unit can perform the image formation after determining that a situation is appropriate for execution of the image formation while considering the field of view of the other user who possesses the other terminal device.

The processing unit may select the image forming job corresponding to the terminal identification information in the beacon signal from among a plurality of image forming jobs stored in an information processing device outside the electronic device when the processing unit determines that, based on the direction information, the terminal device is positioned in the first range, and perform image formation based on the selected image forming job.

In this way, the processing unit can perform the image formation based on the image forming job stored in the external information processing device.

The processing unit may determine, when the processing unit determines that the terminal device is positioned in the first range, whether to perform the image formation based on a signal strength change amount of the beacon signal.

In this way, the processing unit can perform the image formation after determining whether the user is a user who uses the electronic device.

When an instruction to execute the image forming job corresponding to the terminal identification information is performed, the processing unit may suspend the image formation based on the image forming job corresponding to the terminal identification information until the processing unit determines that, based on the direction information, the terminal device is positioned in the first range.

In this way, a timing at which the electronic device executes the image formation can be made appropriate.

The beacon signal based on which the direction information acquisition unit acquires the direction information may conform to the Bluetooth standard.

In this way, it is possible to construct a system which performs the image formation using Bluetooth.

A processing method according to the embodiment includes: performing wireless communication of wirelessly communicating with a terminal device; performing processing of acquiring, based on a beacon signal received based on the wireless communication, direction information related to a direction of the terminal device with respect to a reference position of an electronic device; and performing image formation based on an image forming job corresponding to terminal identification information in the beacon signal when a determination is made that, based on the direction information, the terminal device is positioned in a first range which is a direction range of a predetermined angle.

A non-transitory computer-readable storage medium storing a program according to the embodiment includes: causing a computer to function as a wireless communication unit configured to wirelessly communicate with a terminal device, a direction information acquisition unit configured to acquire, based on a beacon signal received by the wireless communication unit from the terminal device, direction information related to a direction of the terminal device with respect to a reference position of the electronic device; and a processing unit configured to perform image formation based on an image forming job corresponding to terminal identification information in the beacon signal when the processing unit determines that, based on the direction information, the terminal device is positioned in a first range which is a direction range of a predetermined angle.

Although the embodiment is described in detail above, it will be easily understood by those skilled in the art that many modifications can be made without substantially departing from the novel matters and effects of the embodiment. Accordingly, such modifications are intended to be in the scope of the present disclosure. For example, a term cited with a different term having a broader meaning or the same meaning at least once in the description or in the drawings can be replaced with a different term at any place in the description or in the drawings. All combinations of the embodiment and the modifications are also in the scope of the present disclosure. Configurations, operations, and the like of the electronic device, the processing method, and the program are not limited to those described in the embodiment, and various modifications can

What is claimed is:

1. An electronic device for wirelessly communicating with a terminal device by a wireless communicator, the electronic device comprising:
   a direction information acquisition unit configured to acquire, based on a beacon signal received by the wireless communicator from the terminal device, direction information related to a direction of the terminal device with respect to a reference position of the electronic device; and
   a processor configured to perform image formation based on an image forming job corresponding to terminal identification information in the beacon signal when the processor determines that, based on the direction information, the terminal device is positioned in a first range which is a direction range of a predetermined angle.

2. The electronic device according to claim 1, wherein the processor performs the image formation when the terminal device is positioned in the first range and in a distance range of a predetermined distance.

3. The electronic device according to claim 1, wherein the reference position is a position of an operator, and the first range is a range including a front direction from the operator.

4. The electronic device according to claim 1, wherein the processor performs the image forming processing based on the image forming job by performing authentication of matching the terminal identification information in the beacon signal with identification information in the image forming job.

5. The electronic device according to claim 1, wherein the processor does not execute the image formation when the processor determines that, based on the beacon signal, the terminal device and another terminal device are positioned in the first range.

6. The electronic device according to claim 5, wherein the processor
determines whether an image related to the image forming job includes confidential information, and
does not execute the image formation when the processor determines that the image related to the image forming job includes the confidential information and that, based on the beacon signal, the terminal device and the other terminal device are positioned in the first range.

7. The electronic device according to claim 5, wherein the processor displays a print suspension screen when the processor determines that, based on the beacon signal, the terminal device and the other terminal device are positioned in the first range.

8. The electronic device according to claim 5, wherein the processor performs image formation based on the image forming job of the terminal device when the processor determines that the terminal device and the other terminal device are positioned in the first range and that a signal strength of the beacon signal from the terminal device is stronger than a signal strength of the beacon signal from the other terminal device.

9. The electronic device according to claim 5, wherein the processor
performs, when the processor determines that the terminal device and the other terminal device are positioned in the first range, predetermined determination of determining whether the other terminal device is positioned in a second range which is a direction range narrower than the first range with reference to the reference position and the direction of the terminal device, and
performs the image formation based on the image forming job of the terminal device when the processor determines that the other terminal device is positioned in the second range in the predetermined determination and that a signal strength of the beacon signal from the terminal device is stronger than a signal strength of the beacon signal from the other terminal device.

10. The electronic device according to claim 1, wherein the processor selects the image forming job corresponding to the terminal identification information in the beacon signal from among a plurality of image forming jobs stored in an information processing device outside the electronic device and performs image formation based on the selected image forming job when the processor determines that, based on the direction information, the terminal device is positioned in the first range.

11. The electronic device according to claim 1, wherein the processor determines, when the processor determines that the terminal device is positioned in the first range, whether to perform the image formation based on a signal strength change amount of the beacon signal.

12. The electronic device according to claim 1, wherein when an instruction to execute the image forming job corresponding to the terminal identification information is performed, the processor suspends the image formation based on the image forming job corresponding to the terminal identification information until the processor determines that, based on the direction information, the terminal device is positioned in the first range.

13. The electronic device according to claim 1, wherein the beacon signal based on which the direction information acquisition unit acquires the direction information conforms to the Bluetooth standard.

14. A processing method comprising:
performing wireless communication of wirelessly communicating with a terminal device;
performing processing of acquiring, based on a beacon signal received based on the wireless communication, direction information related to a direction of the terminal device with respect to a reference position of an electronic device; and
performing image formation based on an image forming job corresponding to terminal identification information in the beacon signal when a determination is made that, based on the direction information, the terminal device is positioned in a first range which is a direction range of a predetermined angle.

15. A non-transitory computer-readable storage medium storing a program, the program comprising:
causing a computer to function as
a wireless communicator configured to wirelessly communicate with a terminal device,
a direction information acquisition unit configured to acquire, based on a beacon signal received by the wireless communicator from the terminal device, direction information related to a direction of the terminal device with respect to a reference position of the electronic device; and
a processor configured to perform image formation based on an image forming job corresponding to terminal identification information in the beacon signal when the processor determines that, based on the direction information, the terminal device is positioned in a first range which is a direction range of a predetermined angle.

* * * * *